Nov. 26, 1957  J. J. JESS, SR  2,814,328
LABEL APPLYING ATTACHMENT FOR BREAD WRAPPING MACHINES
Filed March 25, 1955  4 Sheets-Sheet 1

INVENTOR.
JOHN J. JESS, SR.
BY
ATTORNEYS

Nov. 26, 1957  J. J. JESS, SR  2,814,328
LABEL APPLYING ATTACHMENT FOR BREAD WRAPPING MACHINES
Filed March 25, 1955  4 Sheets-Sheet 2
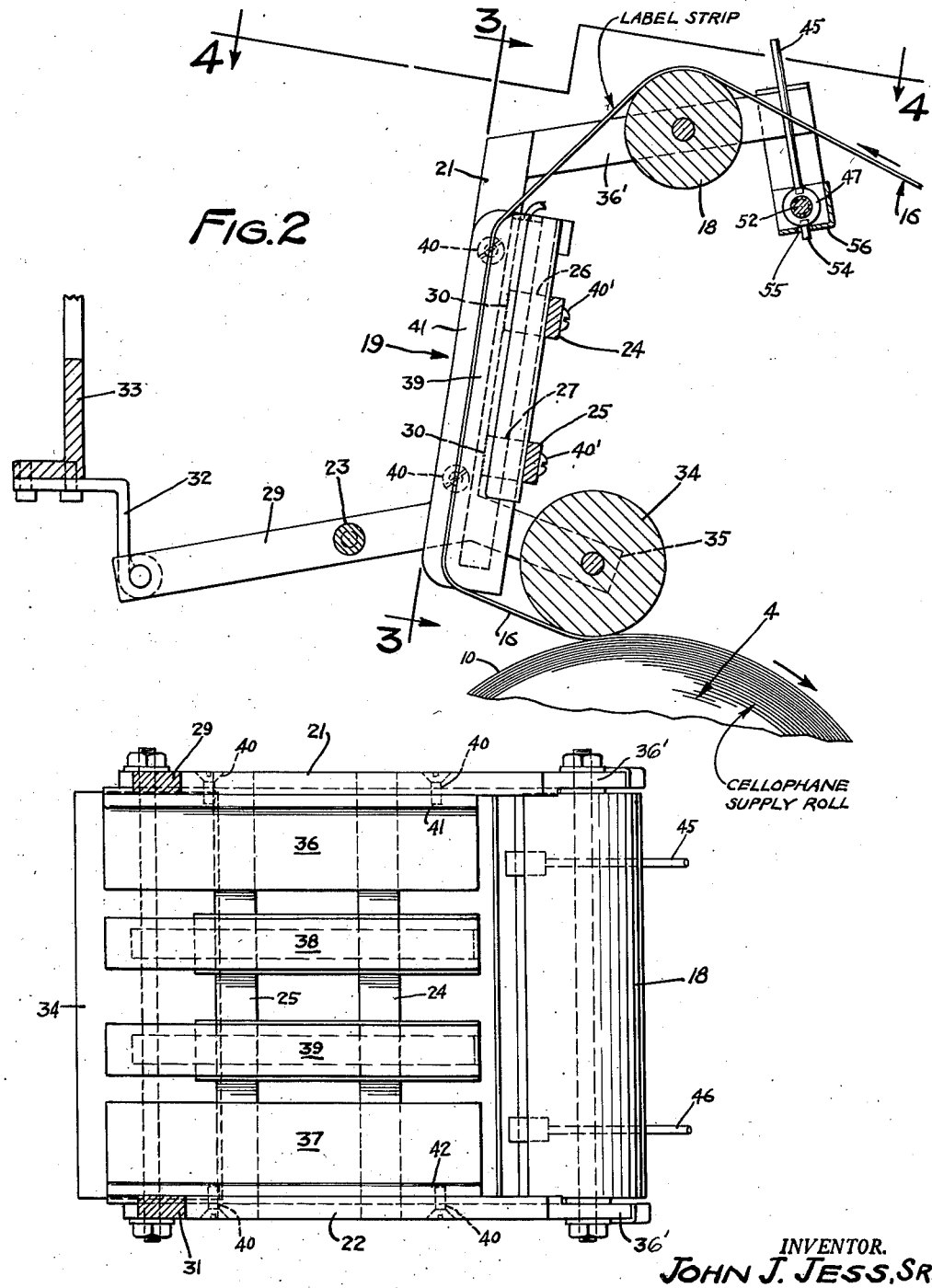
INVENTOR.
JOHN J. JESS, SR.
BY
ATTORNEYS

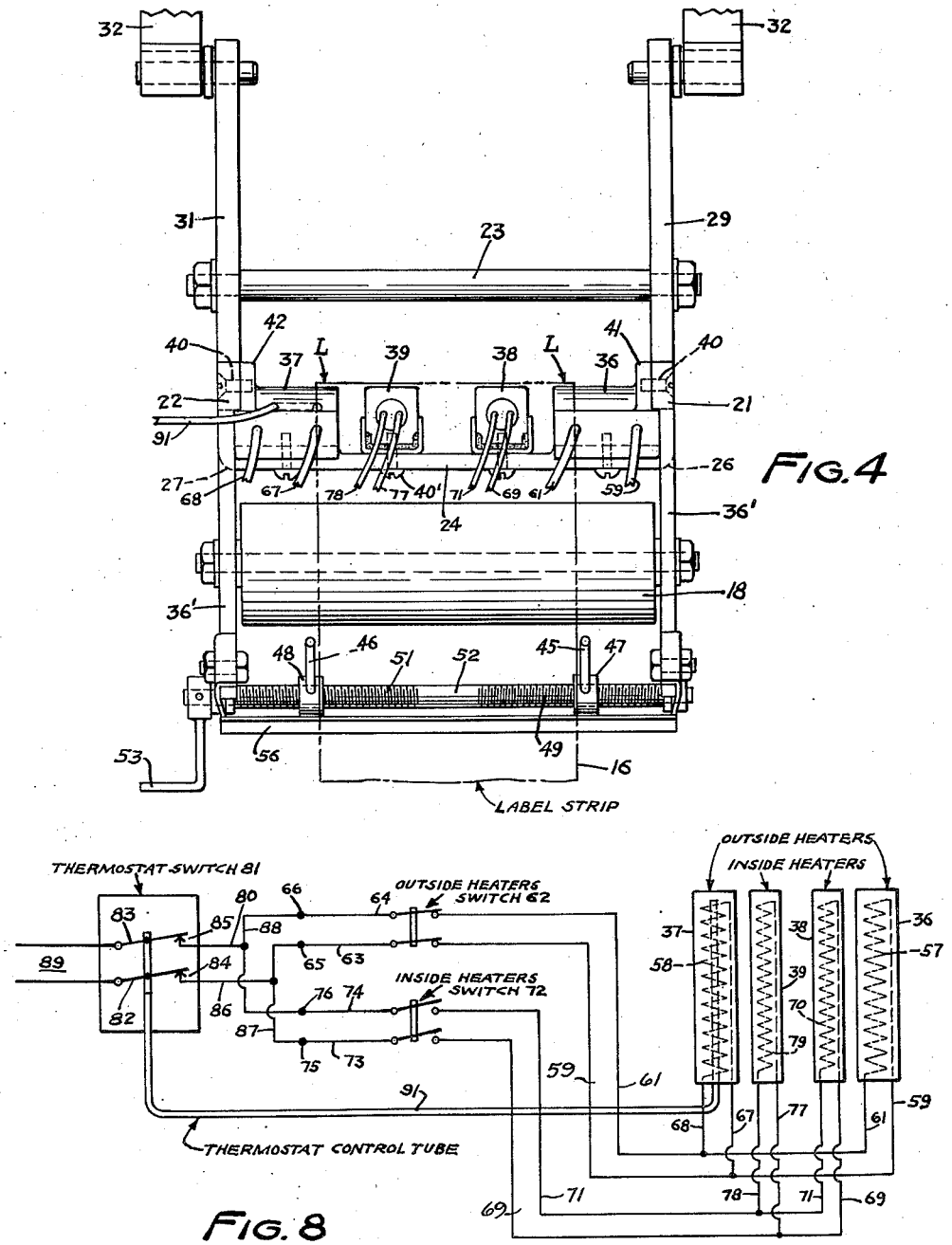

Nov. 26, 1957   J. J. JESS, SR   2,814,328
LABEL APPLYING ATTACHMENT FOR BREAD WRAPPING MACHINES
Filed March 25, 1955   4 Sheets-Sheet 4

INVENTOR.
JOHN J. JESS, SR.
BY
ATTORNEYS

2,814,328

LABEL APPLYING ATTACHMENT FOR BREAD WRAPPING MACHINES

John J. Jess, Sr., Fargo, N. Dak., assignor to Regan Bro's. Company, Minneapolis, Minn., a corporation of Minnesota Application March 25, 1955, Serial No. 496,801

6 Claims. (Cl. 154—1.6)

This invention relates to new and useful improvements in bread wrapping machines, and more particularly to a novel label applying attachment for such machines.

It is now common practice in the manufacture and distribution of bread and other bakery goods, to wrap each loaf of bread in a transparent wrapping material such as cellophane, which is non-porous and readily foldable, whereby it may readily be wrapped about each loaf of bread and its ends folded into closing and sealing engagement to provide a highly sanitary wrapping for the bread loaves, or other bakery goods so wrapped. Furthermore, the transparency of cellophane makes it a highly desirable wraping material for bread and other articles of food, as it makes it possible for the purchaser to readily view and inspect the contents of each package before purchasing it.

It is also common practice to apply to each package or loaf the trademark or brand name of the goods and the name of the manufacturer, and often limited advertising matter. This may be accomplished by printing the name directly upon the outer wrapper of each loaf, but for economy of operation, it is usually applied to each bread loaf by applying thereto a separate label in the form of a band which encircles each loaf. A web of wrapping material such as waxed paper or cellophane is then wrapped around the loaf and attached thereto, whereby the label is enclosed within the cellophane wrapper.

Since cellophane and other transparent wrapping materials of a non-porous nature have been used for wrapping bread loaves, it has become common practice for many housewives to retain the transparent wrapper of the bread loaf as a means in which to store and preserve the partially used loaf until it is consumed. When it is to be so used, the housewife usually opens but one end of the wrapper and removes the slices from such end, as the bread is consumed. When a sliced loaf of bread is partially withdrawn from its wrapper, it is sometimes difficult to reinsert it into the wrapper, because the label may become misplaced on the bread loaf, and its edges may also engage the wrapper and thus materially interfere with the reinsertion of the sliced loaf into its wrapper.

It is therefore highly desirable that the label-bearing band be so fixed to the wrapper that the opposed marginal edges thereof are held firmly in engagement with the surface of the wrapper, whereby such edges cannot interfere with the removal of the bread from the wrapper or its re-insertion thereinto.

It is also an important object of the present invention to provide means for affixing the label band directly to the interior surface of the wrapping material or cellophane, whereby its opposed marginal edges only are bonded or affixed to the surface of the wrapping material, whereby the edges of the label cannot interfere with the removal of the bread from the wrapper or its reinsertion thereinto, and whereby the major portion of the width of the label is unsecured to the wrapper, whereby advertising matter appearing thereon is not likely to become marred by adhesives, and the like, with the result the completed package will be very neat and attractive in appearance.

A further object of the invention is to provide an attachment for conventional bread wrapping machines which is positioned in the wrapping machine in such a manner that a continuous waxed web or band of label material is fed from a supply roll into direct engagement with the web of wrapping material, as the latter is fed into the machine and into subsequent engagement with each bread loaf, said attachment functioning to heat only the opposed marginal edges of the waxed label band, just prior to said band engaging the web of wrapping material, whereby the wax embodied in the label band is reactivated to cause it to bond the label band to the web of wrapping material or cellophane simultaneously as the latter is fed into the machine into engagement with the bread loaves successively entering the machine to receive wrappers.

A further and more specific object of the invention is to provide a label heating device located adjacent to the supply roll of wrapping material or cellophane on the wrapping machine, and so positioned relative thereto as to accurately guide a heated web of label material into engagement with the web of wrapping material, and said device comprising a pressure roller for firmly pressing the opposed heated edges of the label strip or band into bonding engagement with the surface of the wrapping material, as the latter leaves the supply roll and enters the machine in its travel towards the wrapping mechanism.

A further object is to provide a label applying attachment of the class described which is extremely simple and inexpensive in construction and readily lends itself for mounting on conventional wrapping machines such as now in common use.

Other objects of the invention reside in the specific construction of the attachment, including the arrangement of the heating elements and the control means therefor; in the means for guiding the label band or web onto the hot plates, whereby only the opposed marginal edges of the label band are subjected to the action of the hot plates; and in the pivotal mounting of the attachment, whereby the major portion of the weight of the device is carried by the cellophane supply roller, and whereby the attachment is freely movable in a vertical plane in accordance with the size of the cellophane supply roll.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 2 is an enlarged detail sectional elevation of the labeling device, showing the label strip passing thereover and into bonding engagement with the web of wrapping material;

Figure 3 is a detail sectional view on the line 3—3 of Figure 2, showing the spacing between the hot plates;

Figure 4 is a detail view on the line 4—4 of Figure 2, showing the upper ends of the heating elements and the means provided for accurately guiding the label strip or band into engagement with the hot plates;

Figure 7:
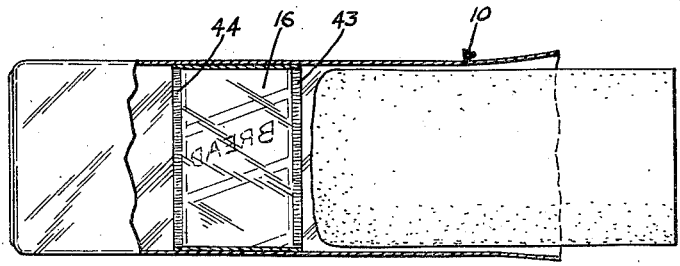

Figure 7 is a detail sectional view of a bread wrapper which has been opened at one end to permit removal of the bread loaf therefrom, and illustrating the marginal edges of the label band adhered to the inner surface of the cellophane wrapper to permit the bread loaf to be readily slid back into the wrapper; and Figure 8 is a wiring diagram showing the control circuits for the heating elements of the four hot plates.

Figure 1:
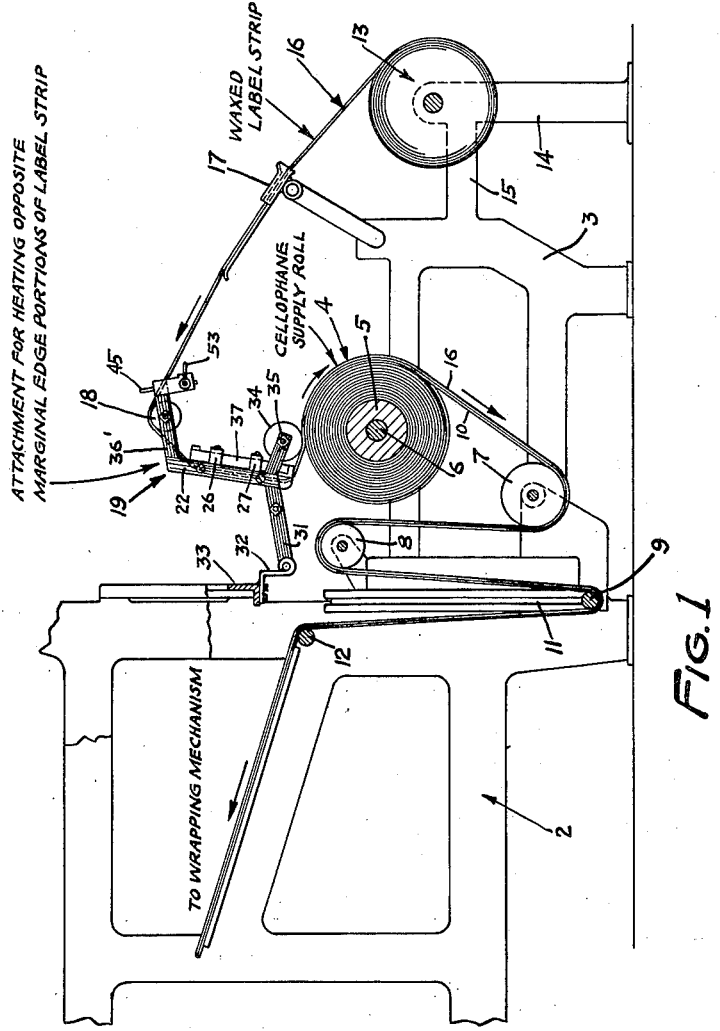
Figure 1 is a side elevational view of a conventional bread wrapping machine, showing my improved label applying device mounted thereon, the wrapping machine being partially broken away.

In the selected embodiment of the invention herein disclosed, there is illustrated in Figure 1, for purposes of disclosure, a portion of a conventional bread wrapping machine comprising the usual frame parts 2 and 3. Means is provided in the frame part 3 for supporting a roll 4 of a suitable wrapping material, such as cellophane. Roll 4 is shown supported on a core 5 which, in turn, is mounted on a shaft 6 having its end portions rotatably supported in the side members of frame part 3, as is well-known in the art.

A pair of guide rollers 7 and 8 are also shown mounted in the frame part 3 adjacent to shaft 6. The web of wrapping material or cellophane is threaded around rollers 7 and 8 and thence downwardly around a weighted roller 9 which has its terminals mounted for vertical movement in suitable guides 11, secured to the side frame members of the machine, as indicated in Figure 1. From the roller 9, the web of wrapping material passes upwardly over a guide roller 12, and thence onward to the wrapper-applying and folding mechanism, not shown in the drawings. The wrapper-applying and folding mechanisms are of conventional well-known construction, and it is therefore believed unnecessary herein to describe the same in detail. Roller 9, as is well-known in the art, is carried by the web of wrapping material, and its function is to retain the web at a uniform tension, as it is fed to the wrapper-applying and folding mechanism.

One of the important features of the present invention resides in the means provided in conjunction with the bread-wrapping machine, for feeding a strip or band of label material into flatwise engagement with the surface of the web of wrapping material which becomes the inner bread-engaging surface of the completed wrapper, when applied to a loaf of bread, as best illustrated in Figure 7.

In accordance with the present invention, the strip or band of label material is furnished in the form of a roll 13, which is removably supported on a standard 14 having a connection 15 with the frame part 3. The strip of label material, designated by the numeral 16, passes from the supply roll 13 through a suitable guide 17, and thence upwardly at an incline and over the top guide roller 18 of the label-heating device, generally designated by the numeral 19.

The label-heating device, as best illustrated in Figures 2, 3 and 4, comprises a frame structure composed of side members 21 and 22 tied together at their delivery ends by a suitable tie rod 23. U-shaped cross members 24 and 25 have their upright leg portions 26 and 27 secured to the bottom edges of side frame members 21 and 22 by such means as welding, indicated at 30 in Figure 2. The side members 21 and 22 are shown provided with laterally extending arms 29 and 31, respectively, having their terminals pivotally connected to suitable brackets 32, secured to the frame portion 33, as best illustrated in Figures 1 and 2. The pivotal connections between arms 29 and 31 of the labeling device permit the device, as a whole, to swing up and down in a vertical plane in accordance with variations in the diameter of the cellophane supply roll 4, during operation of the machine.

The frame of the labeling device 19 is normally supported in an upright position, as shown in Figure 2. To so support the device, a pressure roller 34 is rotatably mounted in laterally extending arms 35 of the labeling device. Roller 34 normally rides or rolls upon the periphery of cellophane roll 4, and serves to press the heated label band or strip 16 into bonding engagement with the cellophane wrapping material, as clearly illustrated in Figure 2.

The label-heating device 19 is provided at its upper end with rearwardly extending arms 36' between which the guide roller 18 is mounted. Guide roller 18 serves to guide the label strip or band onto the hot plates of the label-heating device, next to be described.

The label-heating device, as best illustrated in Figures 3, 4 and 8, comprises, in its present form, two sets of hot plates 36—37 and 38—39. The outer hot plates 36—37 are preferably relatively wider than the inner hot plates 38—39, and are provided adjacent to the frame members 21 and 22 with upright flanges 41 and 42, respectively, as best illustrated in Figure 4. Screws 40 secure flanges 41 and 42 to the side members 21 and 22, respectively. The outer hot plates 36 and 37 may also be secured to the two U-shaped cross members 24 and 25 by such means as screws 40. The relatively smaller inner hot plates 38 and 39 are secured to the cross members 24 and 25 by screws 40'.

Another important feature of the present invention resides in the unique construction of the label-heating device 19, whereby only the marginal side edges of the waxed label strip or band is heated sufficiently to reactivate the wax coating thereon to cause it to adhere to the surface of the cellophane, as the heated side edges of the label strip are pressed into bonding engagement with the cellophane by the pressure roller 34.

To thus heat only the marginal side edges of the waxed label strip or band 16, either the two outer hot plates 36—37 may be employed, or the two inner hot plates 38—39, depending upon the width of the label material to be used. In the present instance, a relatively wide label band is utilized, whereby only the outer hot plates 36—37 are heated. The hot plates 36 and 37 are so spaced apart that they engage and heat only the marginal side edge portions of the label band which overlie the heating elements 36 and 37, as indicated at L in Figure 4, whereby the wax coating on said marginal side edge portions is reactivated to cause said edge portions to become bonded to the surface of the cellophane wrapper.

Figure 6:
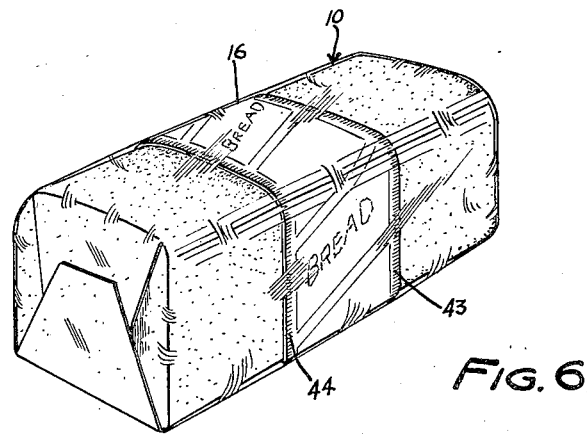
Figure 6 is a perspective view showing a completely wrapped bread loaf with the label band in position within the wrapper.
Figure 5:
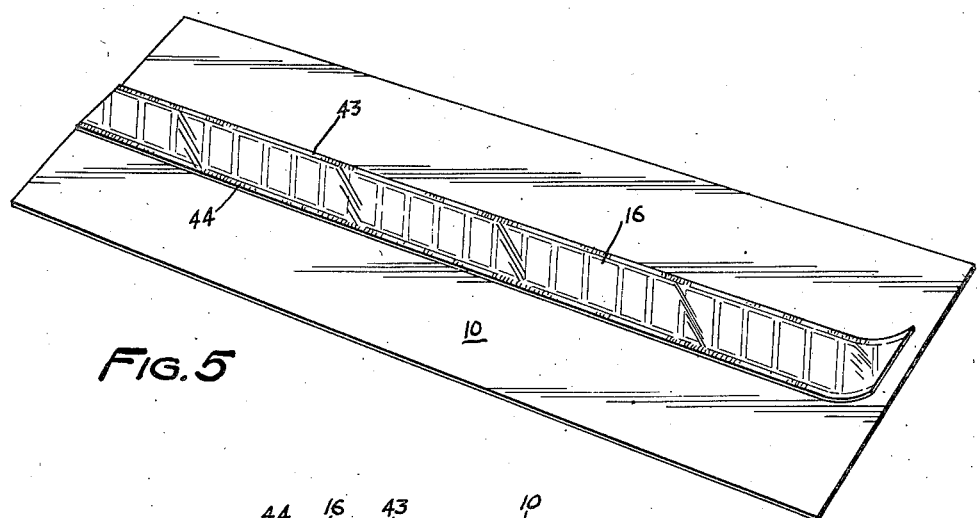
Figure 5 is a perspective view of a portion of wrapping material or cellophane, showing the label material bonded thereto along its opposed marginal side edges.

The intermediate hot plates 38—39 are not heated when the outer hot plates 36 and 37 are used, whereby only the marginal side edges of the label-forming band are fixedly bonded to the surface of the cellophane wrapper, as indicated at 43 and 44 in Figures 5, 6 and 7, and as above described.

The machine herein disclosed is adapted to handle two different sizes or widths of label material. When a relatively narrower label is to be used than the one now shown in Figure 4, then the strip of label material is so fed to the inner hot plates 38 and 39 that only the marginal side edge portions thereof will engage the adjacent edge portions of the inner hot plates 38 and 39. Thus, only the marginal side edge portions of said narrower label band will be reactivated to cause said edge portions to become bonded to the cellophane web, as it passes under pressure roller 34. Under such conditions, the outer hot plates 36—37 may be left on, as the fact that they may be hot will have no effect upon the relatively narrower label band passing over the two intermediate hot plates 38—39.

Means is provided at the receiving end of the label-heating device 19 for accurately guiding the strip of label material 16 onto the hot plates. Such means is shown comprising a pair of upright guide fingers 45 and 46 having hubs 47 and 48, respectively, threaded to receive left and right-hand threaded portions 49 and 51, respectively, of a rotatably mounted cross shaft 52. Shaft 52 has a crank 53 secured to one end thereof to facilitate rotating said shaft. The hubs 47 and 48 are shown provided with depending studs or pins 54 adapted for traveling movement in a horizontal guide slot 55, provided in a cross member 56, thereby to retain the guide fingers 45 and 46 in their upright operating positions, as best shown in Figure 2. Rotation of shaft 52 by crank 53 longitudinally translates the guide pins 45 and 46 on the shaft 52 in opposite directions, whereby the spacing between said guide pins may be quickly adjusted to different widths of label-forming material, as will be understood.

The wiring diagram shown in Figure 8 diagrammatically illustrates the electrical control circuits for the hot plates 36—37 and 38—39. The outer hot plates 36—37 are provided with suitable heating elements 57 and 58, respectively. Wires 59 and 61 connect heating element 57 to one side of a conventional on-and-off control switch 62, the other side of which is shown connected by wires 63 and 64 to a pair of terminal posts 65 and 66, respectively. Heating element 58 of hot plate 37 is connected in parallel with wires 59 and 61 of heating element 57 by wires 67 and 68, respectively.

Inner hot plate 38 has a heating element 70 having wires 69 and 71 connecting it to one side of a conventional on-and-off control switch 72, similar to switch 62. The other side of switch 72 is connected by wires 73 and 74 to a pair of terminal posts 75 and 76. Wires 77 and 78 connect heating element 79 of hot plate 39 in parallel with wires 69 and 71 of heating element 68.

Thermostatic means is shown provided for preventing the hot plates from becoming overheated, and is shown comprising a thermostatic switch 81 of conventional construction. In the wiring diagram, the thermostatic switch 81 is shown comprising movable contacts 82 and 83, normally in electrical engagement with fixed contacts 84 and 85, respectively. Contact 84 is shown connected by wire 86 to wire 87, which, in turn, is electrically connected to terminal posts 65 and 75. Stationary contact 85 of the thermostatic switch 81 is electrically connected by a wire 80 to a wire 88 having its ends connected to terminal posts 66 and 76. A main supply circuit, generally designated by the numeral 89, is electrically connected to the movable contacts 82 and 83 of thermostatic switch 81, as clearly illustrated in the wiring diagram, Figure 8.

The thermostatic switch 81 is shown operated by a conventional control tube 91 having one end supported, preferably in a groove provided in the bottom of hot plate 37, whereby it is directly influenced by the temperature of heating element 59, thereby to automatically open thermostatic switch 81, when the temperature of hot plate 37 reaches a predetermined figure.

In the operation of the apparatus, the guide pins 45 and 46 are adjusted to the width of the strip of label material to be fed into the machine by manipulation of crank 53. When the outer hot plates 36—37 are to be utilized, control switch 62 is closed, whereupon current is supplied to the heating elements of hot plates 36—37. As soon as the hot plates have been heated sufficiently to reactivate the wax coating on the label strip or band, the machine may be started, whereupon the strip of label material passes over hot plates 36 and 37 and into direct engagement with the web of cellophane immediately in advance of the pressure roller 34.

As the heated label strip is brought into engagement with the cellophane roll 4, as shown in Figure 2, roller 34 firmly presses the heated side edge portions of the label strip into bonding engagement with the surface of the cellophane web along its length, as will be understood by reference to Figure 5. The composite web, including the cellophane and label strip, then passes around rollers 7 and 8 and downwardly under the weighted roller 9, and thence upwardly over guide roller 12 and onto the wrapping and folding mechanism, as is well known in the art. The cellophane web is drawn from the supply roll 4 by the action of the folding and wrapping mechanisms, as is well known in the art.

In the operation of enveloping each loaf of bread in a cellophane wrapper 10, the wrapper is transversely severed into sections of adequate length for the particular size of bread loaves to be wrapped, to provide sufficient wrapper material at the ends of the loaf to permit the wrapper to be folded into its sealed condition at the ends of each load, as clearly illustrated in Figure 6. When the cellophane has thus been applied to the loaf, it will be noted that the label band is disposed within the wrapper 10 at approximately the central portion of the loaf, and its bonding to the cellophane wrapper does not, in any way, mar or cause wrinkling in the outer wrapper, because of the label band being secured to the wrapper 10 along its marginal side edges only, as indicated at 43 and 44 in Figures 6 and 7.

Also, by securing the label in position on the inner surface of the cellophane wrapper as above described, when said wrapper is subsequently opened at one end of the bread loaf, as indicated in Figure 7, the loaf or bread slices may readily be withdrawn therefrom without interference from the edges of the label band. In like manner, the sliced loaf may readily be shoved back into the cellophane wrapper without interference from the label band, after which the open end of the wrapper may be folded inwardly over the end of the bread loaf to close and seal the package to the atmosphere, and for storage purposes.

To thus secure only the side edge portions of the label to the inner surface of the wrapper, has proved highly desirable in the trade, as it positively eliminates any danger of the label interfering with the removal of the sliced loaf or bread from the wrapper.

Another important feature of the invention resides in the lateral spacing of the hot plates to provide adequate air circulation therebetween when the machine is in operation. Such air circulation is necessary to prevent reactivation of the wax coating on the intermediate portion of the waxed label strip or band to prevent such intermediate portion from adhering to the cellophane wrapper.

In the wiring diagram, Figure 8, I have shown two control circuits, one for each set of hot plates, whereby the heating elements of said sets of hot plates may be operated independently of one another. It is essential, however, that control switch 72 be provided in order that the intermediate hot plates 38—39 may be rendered inoperative when utilizing the outer hot plates 36—37. When only the inner hot plates are to be used, the circuit for supplying current to the outer hot plates 36—37 may be left on, if desired, as heating the outer hot plates 36—37 will have no effect upon the waxed label band passing through the device, when the marginal edge portions thereof do not actually engage the outer hot plates.

It will also be noted that the thermostatic switch 81 is shown connected to only one of the outer hot plates. If deemed advisable, however, it may also be connected to one of the intermediate hot plates, in which case the inner set of hot plates 38—39 would not be dependent upon the outer hot plates 36—37 for their automatic control. As now shown in the drawing, it is necessary to heat the outer hot plates 36—37 whenever the machine is in operation, in order to provide automatic shut-off of the heat, when the temperature of the hot plates being used reaches a predetermined figure.

Also, if desired, the control switches 62 and 72 may be dispensed with, and conventional outlet receptacles and plugs substituted therefor. The switches 62 and 72 are for convenience only.

The foregoing detailed description has been given for clearness of understanding only, and no unnecessary limitations should be understood therefrom, but the appended claims should be construed as broadly as permissible in view of the prior art.

I claim as my invention:

1. In combination with a bread wrapping machine comprising a frame having means thereon for supporting a roll of cellophane in web form, and means for drawing the cellophane web from said roll and delivering it to the bread wrapping mechanism of said machine, of a device for applying a wax label band directly to the cellophane web in the form of an elongated strip, a pressure roller at one end of said device disposed over the cellophane roll, said device having a guide roller at its opposite end, means on the machine for supporting a roll of waxed label material, dual pairs of laterally spaced hot plates, one pair of said plates being positioned to engage only the opposite marginal side edge portions of a label strip falling within a given width range, and the other pair of said hot plates being positioned to engage only the opposite marginal side edge portions of a label strip falling within a relatively greater width range, means for selectively heating said pairs of hot plates in accordance with the width of the label strip to be applied, said hot plates serving to heat the wax on the marginal side edge portions of said label strips, thereby to reactivate the wax on the marginal side edge portions of said strips to cause said marginal side edge portions to become bonded to the surface of the cellophane web when pressed thereagainst by the pressure roller.

2. A label-applying attachment for a bread wrapping machine comprising a main frame, an auxiliary frame having laterally spaced side members, a freely rotatable pressure roller mounted at one end of said frame adapted to be driven by peripheral engagement with the periphery of a supply roll of cellophane, a pair of laterally spaced parallel hot plates mounted between the side members of said auxiliary frames in fixed relation relative thereto, heating elements for heating said hot plates, means at the opposite end of the auxiliary frame for accurately guiding a waxed label strip onto said hot plates, to assure that only the opposite marginal side edge portions of said strip engage said hot plates to cause reactivation of the wax coating thereon prior to said pressure roller pressing the marginal edge portions of said strip into bonding engagement with the cellophane web.

3. An attachment according to claim 2, wherein dual pairs of hot plates are mounted in said auxiliary frame in spaced parallel relation to provide air gaps therebetween to prevent heating and reactivation of the waxed surface of the central portion of the waxed label strip.

4. An attachment according to claim 3, wherein each hot plate has a heating element, and the heating elements of each pair of hot plates are connected in parallel for simultaneous operation, the heating elements of said dual pairs of hot plates being provided with independent control circuits to provide a selective control for the hot plates in accordance with the width of the label band to be applied to the cellophane wrapper, and thermostatic means for automatically preventing overheating of the hot plates.

5. A label-applying attachment for bread wrapping machines of the type wherein a strip of label material is attached directly to a web of cellophane wrapping material prior to enveloping each loaf of bread within a cellophane wrapper, said attachment comprising an auxiliary frame having means at one end for pivotally mounting it on the wrapping machine frame, whereby said attachment is adapted for vertical swinging movement, a freely rotatable pressure roller at the lower end of said auxiliary frame adapted to roll on the periphery of the cellophane supply roll, a plurality of elongated hot plates mounted in the auxiliary frame in laterally spaced parallel relation, a guide roller at the upper end of said attachment, and an adjustable guide comprising upright laterally spaced guide elements between which the strip of label material must pass on entering the attachment, and a supporting shaft for said guide elements, said shaft being readily rotatable thereby to effect relative adjustment of said guide elements thereon in opposite directions to assure guiding the waxed label strip into accurate alignment with the hot plates, and whereby only the opposite marginal side edge portions of said strip are heated to effect reactivation of the waxed surfaces thereof.

6. An attachment according to claim 5, wherein the hot plates are laterally spaced apart to provide air gaps therebetween to prevent reactivation of the waxed coating on the intermediate portion of the label strip.

References Cited in the file of this patent

UNITED STATES PATENTS

| | | |
|---|---|---|
| 1,926,245 | Schmitt | Sept 12, 1933 |
| 2,082,114 | Littlefield | June 1, 1937 |
| 2,527,272 | Lyon et al. | Oct. 24, 1950 |
| 2,590,239 | Elsman | Mar. 25, 1952 |